M. L. HYDE.
DUMP CAR.
APPLICATION FILED OCT. 15, 1910.
1,014,396.
Patented Jan. 9, 1912.
3 SHEETS—SHEET 1.
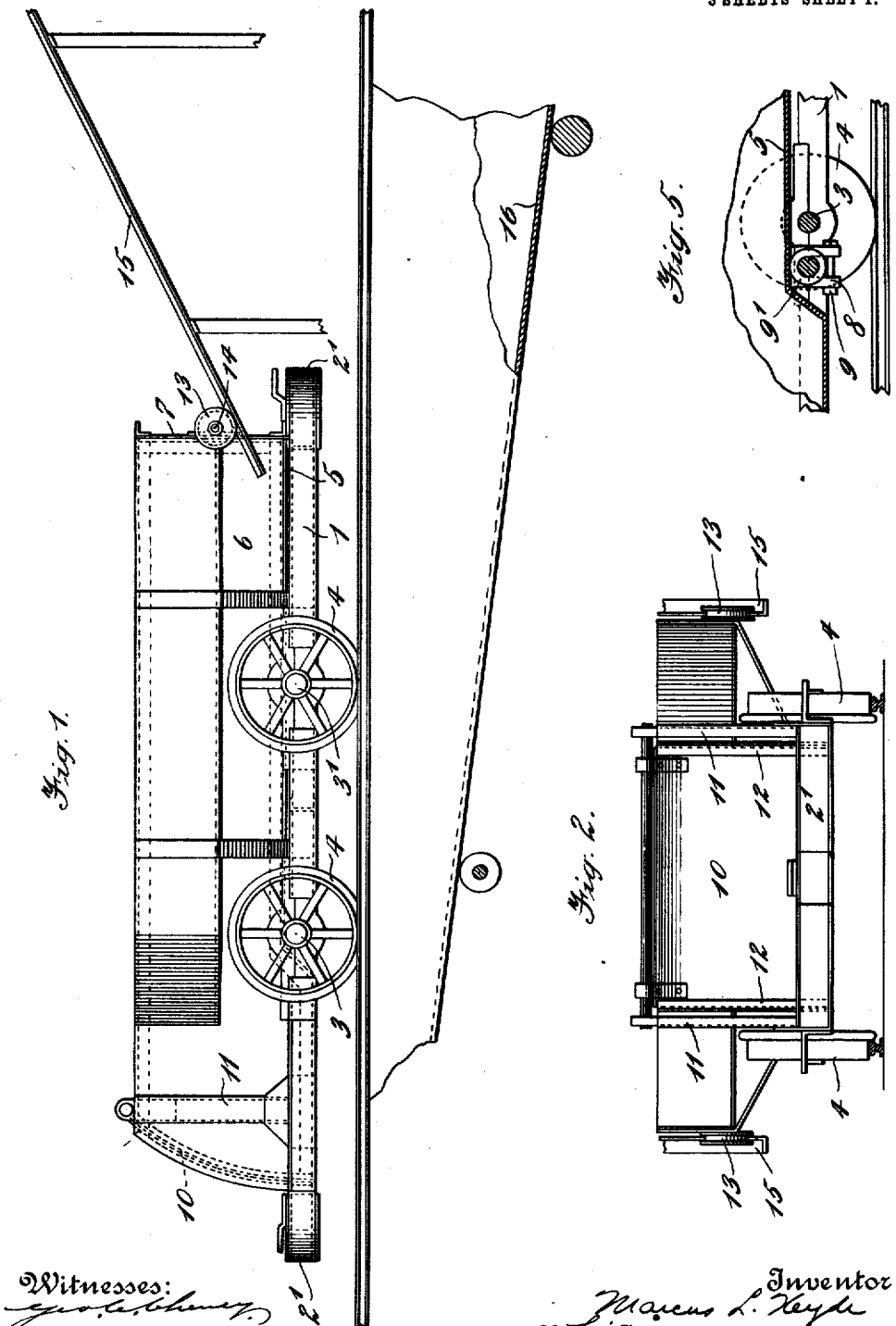

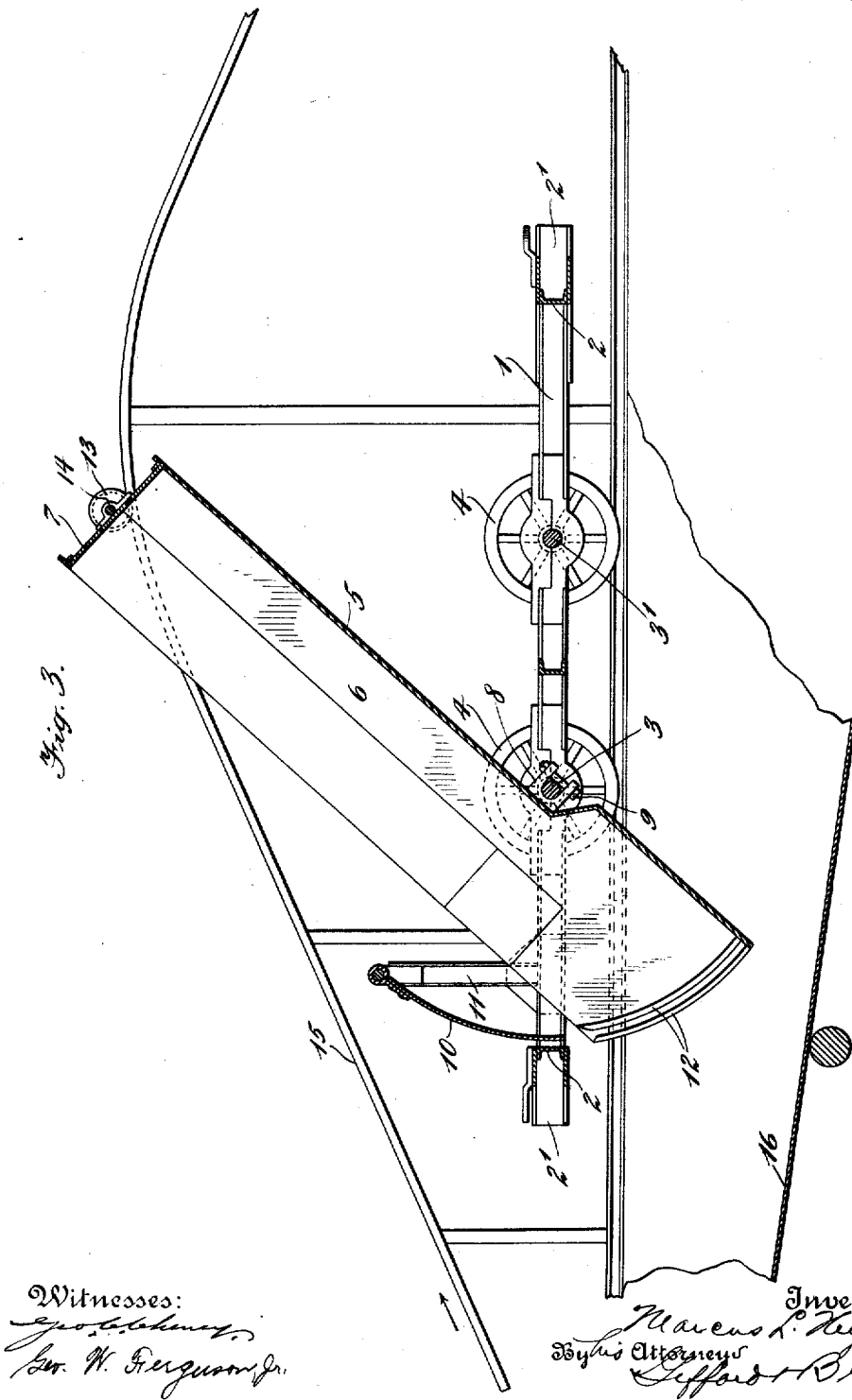

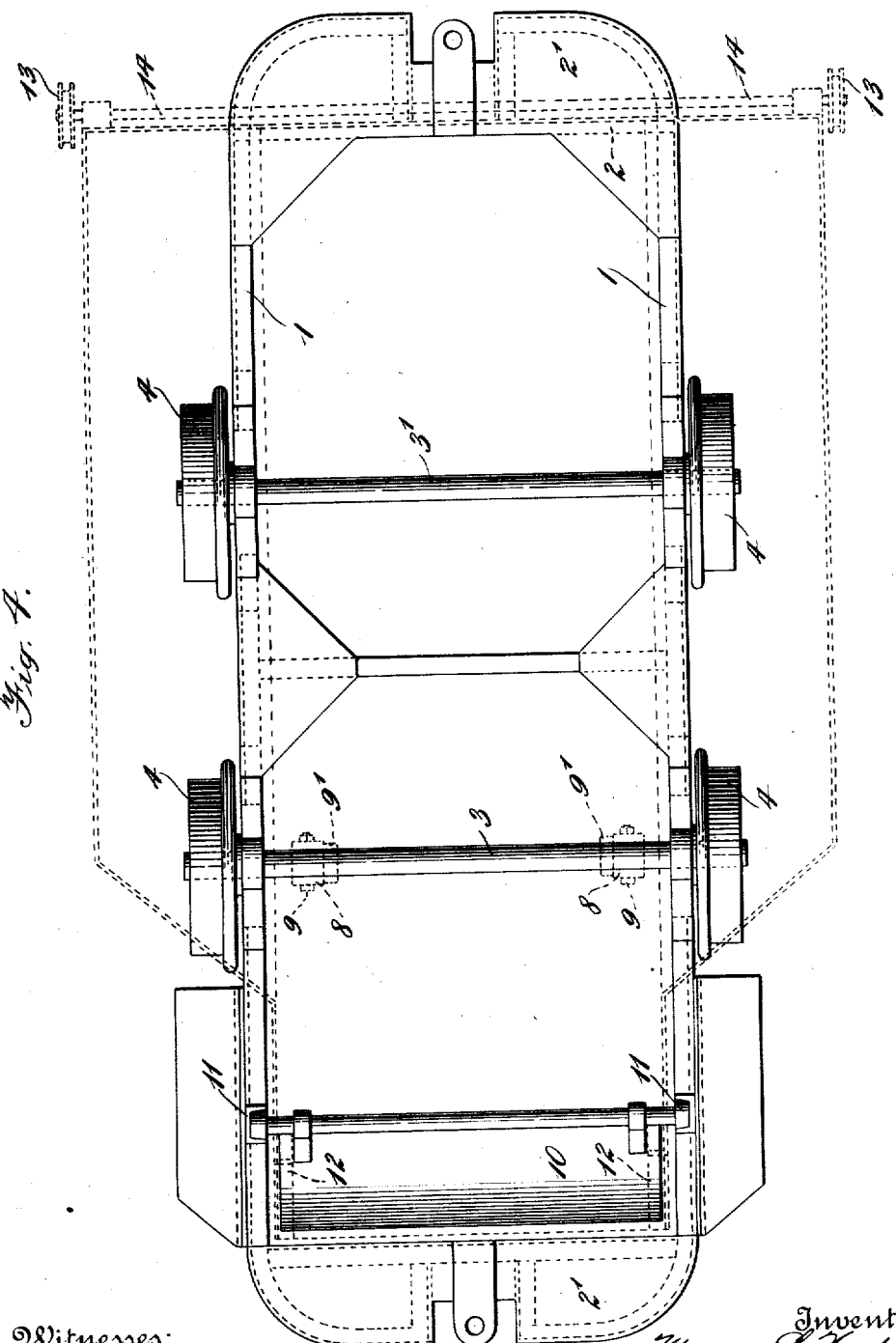

UNITED STATES PATENT OFFICE.

1,014,396. DUMP-CAR. MARCUS L. HYDE, Chicago, Ill., assignor to William D. Ord, Landgraff, W. Va. Filed Oct. 15, 1910. Serial No. 587,169.

*To all whom it may concern:*

Be it known that I, MARCUS L. HYDE, a citizen of the United States, residing at Chicago, in the county of Cook and State of Illinois, have invented certain new and useful Improvements in Dump-Cars, of which the following is a specification.

My invention relates to a dump car designed more particularly for use in discharging materials such as coal, ore, stone, etc., from trains made up of any number of cars and when in motion.

In the drawings accompanying the specification Figure 1 is a side elevation of a car, embodying one form of my invention, about to be dumped; Fig. 2 an end view thereof in the direction of the arrow of Fig. 1; Fig. 3 a longitudinal section of the car in dumping position; Fig. 4 a plan of the truck with the body of the car in dotted lines, and Fig. 5 a detail of a modification.

Similar reference numerals indicate similar parts in the several views.

In the construction shown, the car comprises a flat truck having side members 1, end members 2 and bumper blocks 2' secured together and braced in a suitable manner to form a support or platform for the body. The truck is carried on axles 3 and 3' and wheels 4, suitable bearings being provided for the axles on the side members 1.

The truck frame projects beyond the wheel base at both ends an amount sufficient to permit proper coupling to adjacent cars. That portion of the truck frame between the point of rotation of the car body and the discharge end is free from any internal bracing to permit the rotation of the discharge end of the car between the sides and end member of the truck.

The body of the car comprises a bottom 5, sides 6, and a closed end 7, these parts being secured together and braced as usual in car construction, and is supported by the truck frame, a convenient construction being to provide angle plates forming a brace for said frame and a support for the body. To increase the capacity of the car I may enlarge the cross section of the body between its point of rotation and the closed end, as shown in Fig. 2, and by the dotted lines in Fig. 4. Secured to the under side of the bottom 5 are U-shaped pedestals 8, which, as shown in Fig. 3, engage the axle 3, the latter forming a pivotal support around which the body may be partially rotated in a vertical plane. Upward displacement of the body is prevented by bolts 9 passing through the dependent lugs of the pedestals, and longitudinal displacement is prevented by said lugs. Transverse displacement is prevented by collars 9' fast on the axle 3' in contact with the pedestals.

The discharge end of the body is closed by a gate 10 supported on column 11 erected from the side members of the truck. The gate 10 is on the arc of a circle struck from the center of rotation of the body. On the sides 6 of the body, at the discharge end, I provide guides 12 spaced sufficiently far apart to permit of the free passage of the sides when the body is rotated, and sufficiently close to form a tight joint to prevent leakage. These guides may be formed in the body of the sides or by securing thereto separate pieces, and the grooves so formed receive the edges of the gate 10.

The car, so far described, may have provision made for dumping it in any suitable manner. I prefer, however, to effect an automatic discharge and have shown a simple means for that purpose, consisting of attachments to the body at or near its closed end. As shown, these are in the form of wheels or rollers 13 mounted on a cross shaft 14, supported in bearings in suitable brackets. These rollers are adapted to engage inclined rails 15 supported on appropriate structural work at the discharging point. The guide rails 15 are so disposed alongside of the trackway at the place of discharge as to engage the wheels 13 and elevate the closed end of the body, effecting a sufficient elevation of the body to insure complete discharge of the contents before the wheels 13 pass the summit of the guide rails 15. The latter, as shown in Fig. 3, are continued beyond the summit and inclined downwardly so as to effect a gradual return of the body of the car to its closed position, the open end engaging the gate 10 to effect the complete closure of the body of the car.

If the discharged material is to be conveyed away from the point of discharge, I provide a suitable chute or hopper for such purpose. In the drawings I have shown the car discharging upon the bottom plate 16 of a mechanical feeder.

Among the advantages incident to the construction above described are: first, a gentle discharge of the material, obviating breakage of the contents and strain upon the car; second, rapidity of discharge; third, economy of operation in that the cars do not have to be detached from a train, each car discharging as it engages the guide rails; fourth, a body so tight at all points as to prevent leakage in transit.

In Fig. 5 I have shown a slight modification in the point of rotation of the car body. Instead of having this point on one of the axles, I have shown an independent axis parallel with the axle and located between the axle 3 and the discharge end, which construction may be advisable in certain applications. The pedestals and collars are the same as shown in Fig. 4.

What I claim and desire to secure by Letters Patent of the United States is:—

1. A car comprising a truck having side and end members, a body carried thereby, said body having an open discharge end, a pivotal support for said body and means for rotating the body about said support to lower the discharge end between the side and end members of the truck, a gate attached to one end of the truck, and means on the body adapted to coöperate with means associated with the track way to lower the discharge end of the body away from said guide.

2. In combination, a car comprising a truck, a body carried thereby, said body having a discharge end of less width than the truck frame, means on the truck for closing the discharge end of the body, rollers carried by the car, and an inclined track with which said rollers are adapted to coöperate to partially rotate said body to discharge the contents thereof and to restore it to closed position.

3. In combination, a car comprising a truck, a body carried thereby, said body having a discharge end of less width than the width of the truck frame, a pivotal support for said car carried by the truck, an inclined track, and means on the car adapted to coöperate with said track to partially rotate the body of the car in the longitudinal direction of the truck to discharge its contents and to restore it to its normal position on the truck.

4. In combination, a car comprising a truck, a body carried thereby, said body having a discharge end of less width than the truck frame, a pivotal support for said body carried by the truck, a trackway over which said car is adapted to travel, a receiver beneath the trackway, and means for lowering the discharge end of said body between the side members of the truck, said pivotal support being so placed that the discharge end of the body, when lowered, will pass into the receiver.

5. In combination, a car comprising a truck, a body carried thereby, said body having a discharge end of less width than the width of the truck frame, a pivotal support for said body carried by the truck, a gate attached to one end of the truck and adapted to close the open end of the body when the latter is in normal position, a trackway over which said car is adapted to travel, a receiver beneath the trackway, and means associated with the trackway to lower the discharge end of the body away from said gate, said pivotal support being so placed that the discharge end of the body, when lowered, will pass into the receiver.

In testimony whereof I have hereunto signed my name in the presence of two subscribing witnesses.

MARCUS L. HYDE.

Witnesses:
 WM. L. CUMMINS,
 C. B. SMITH.